UNITED STATES PATENT OFFICE.

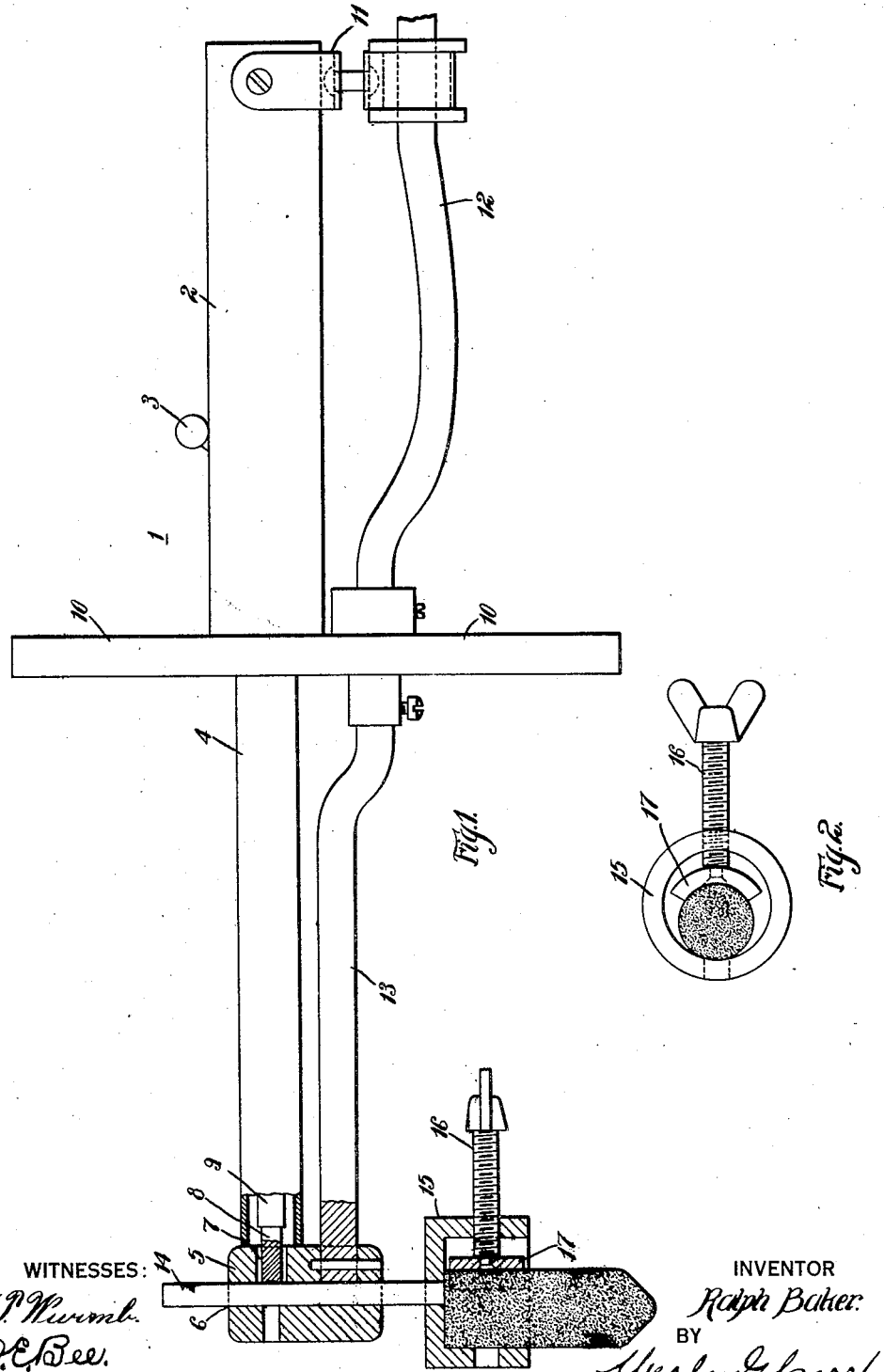

RALPH BAKER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRODE-ADAPTER.

1,336,603.  Specification of Letters Patent.  Patented Apr. 13, 1920.

Application filed November 16, 1918. Serial No. 262,794.

*To all whom it may concern:*

Be it known that I, RALPH BAKER, a citizen of the United States, and a resident of Wilkinsburg, in the county of Allegheny and State of Pennsylvania, have invented a new and useful Improvement in Electrode-Adapters, of which the following is a specification.

My invention relates to carbon-electrode adapters for metallic-electrode holders.

The primary object of my invention is to make possible the employment of a carbon electrode of relatively large diameter with an electrode holder having an electrode-receiving opening of relatively small diameter.

It is highly desirable, in welding operations, in a great many instances, to preheat, scarf or clean the work preliminary to welding and, in order to accomplish this, it is necessary to employ a carbon electrode. In ordinary metallic-electrode holders, the receptacle for the metal electrode usually has an opening of relatively small diameter and, consequently, is not adapted to receive carbon electrodes, which are ordinarily of relatively large diameter.

In view of this, one object of my invention is to provide an adapter which shall facilitate employment of a carbon electrode with the ordinary metallic-electrode holder and, thereby, make possible the preliminary operations necessary in welding with a metal electrode without employing two electrode holders, one of which is adapted for use with a metal electrode and the other with a carbon electrode.

Carbon-electrode holders are ordinarily of much heavier construction than metal-electrode holders on account of the heavier duty required of them. It is often necessary that a carbon electrode shall be employed for certain operations in welding where the work would not necessitate such a heavy electrode holder as is ordinarily required for carbon electrodes. On account of this, another object of my invention is to provide an adapter whereby the relatively light metallic-electrode holder may be utilized in performing work with both metallic and carbon electrodes.

With these and other objects in view, my invention will be more fully described, illustrated in the drawings, in which like numerals indicate corresponding parts, and then more particularly pointed out in the claims.

In the drawings, Figure 1 is a side view, partly in elevation and partly in section, of a standard electrode holder, showing my carbon adapter employed therewith, and Fig. 2 is a bottom plan view of a carbon-electrode adapter which embodies my invention.

My carbon holder or adapter is particularly applicable for use with a metallic-electrode holder of the particular construction disclosed in a Patent Number 1,303,230, issued to me May 13, 1919. This holder is shown in the drawings to illustrate an application of my present invention but in view of the above-mentioned application, only a brief description thereof will be given herein.

In Fig. 1, the electrode-supporting implement 1 comprises a tubular handle 2 having a supporting member 4 which extends into the tubular handle 2 and supports, at its other end, an electrode holder 5. The electrode holder 5 has an opening 6 which is adapted to receive an electrode of relatively small diameter. The holder 5 has also an opening 7 to permit a resiliently-actuated electrode-engaging member 8 to make contact with an electrode located in the opening 6, the member 8 being an extension of a sectional member 9 which projects through the tubular member 4 and into the handle 2 where it is engaged by a spring (not shown). The electrode-engaging member 8 is normally held in contact with an electrode placed in the opening 6 but may be withdrawn therefrom to release the electrode by operating a lever 3 that projects through the handle.

A shield 10, having a suitable opening to receive the tubular member 4, is mounted upon the handle 2. A swiveled support 11 is mounted upon, and depends from, the outer end of the handle 2 and coöperates with the shield 10 to support a lead-in cable 12 which is connected to the holder 5 by a rod or other suitable conductor 13.

My carbon-electrode adapter is shown employed with the implement 1 and comprises a supporting member or rod 14 connected to, or formed integrally with, a cylindrical socket-member 15. The cylindrical member 15 has a threaded opening to receive a winged set screw 16 which has a swivel connection with an arcuate clamping member 17.

My carbon holder may be employed with the electrode holder shown and described by first inserting a carbon electrode into the chamber or socket of the cylindrical member 15 and advancing the winged set screw 16 until the clamping member 17 makes clamping engagement with the electrode. The supporting rod 14 may then be inserted into the electrode-receiving opening 6, in the holder 5, where it is engaged and held in place by the engaging member 8, in essentially the same manner as a metallic electrode would be. With the supporting rod thus held in position, the holder is in readiness to be used with the carbon electrode and, when the work has been sufficiently preheated or cleaned, the carbon electrode may be removed therefrom by merely operating the releasing member 3. The supporting rod 14 will drop out of the holder 5, when released, in the same manner as a metallic electrode would do; a metallic electrode may be inserted in the holder and the welding operation may then be proceeded with in the usual manner. The operation of changing from a metallic electrode to a carbon electrode may be easily and quickly done and does not require any more adjustment than that ordinarily employed for changing from one used metal electrode to another.

Although I have described specifically one method of employing my carbon-electrode adapter, it is obvious that various applications may be found for it and I desire, therefore, that no limitations shall be placed thereupon except such as are imposed by the prior art or are specifically set forth in the appended claims.

I claim as my invention:

1. The combination with a metallic-electrode holder, of a carbon holder therefor comprising a support applicable to the holder, a carbon-receiving means projecting therefrom and means for clamping a carbon therein.

2. The combination with a metallic-electrode holder, of a carbon holder therefor comprising a receiving chamber for the carbon electrode, means for clampingly engaging said electrode and a supporting rod projecting from a wall of the chamber and applicable to the holder.

3. The combination with a metallic-electrode holder, of a carbon holder therefor comprising a receiving chamber for the carbon electrode, means for clampingly engaging said electrode, said means including an arcuate clamping member and a winged set-screw having a swivel connection therewith, and a supporting rod projecting from a wall of the chamber and applicable to the holder.

4. The combination with a metallic-electrode holder having an electrode-receiving opening of relatively small diameter, of a carbon adapter therefor comprising a holder having a receiving chamber of relatively large diameter, and means for suspending the last-mentioned holder from the first.

5. The combination with a metallic-electrode holder having an electrode-receiving opening of relatively small diameter, of a carbon adapter therefor comprising a holder having a receiving chamber of relatively large diameter and a rod projecting from a wall of the receiving chamber and adapted to fit into the opening of small diameter in the electrode holder, whereby the adapter containing a carbon electrode is rigidly supported by the metallic-electrode holder.

In testimony whereof I have hereunto subscribed my name this 30th day of Oct. 1918.

RALPH BAKER.